United States Patent Office 2,809,297
Patented Oct. 8, 1957

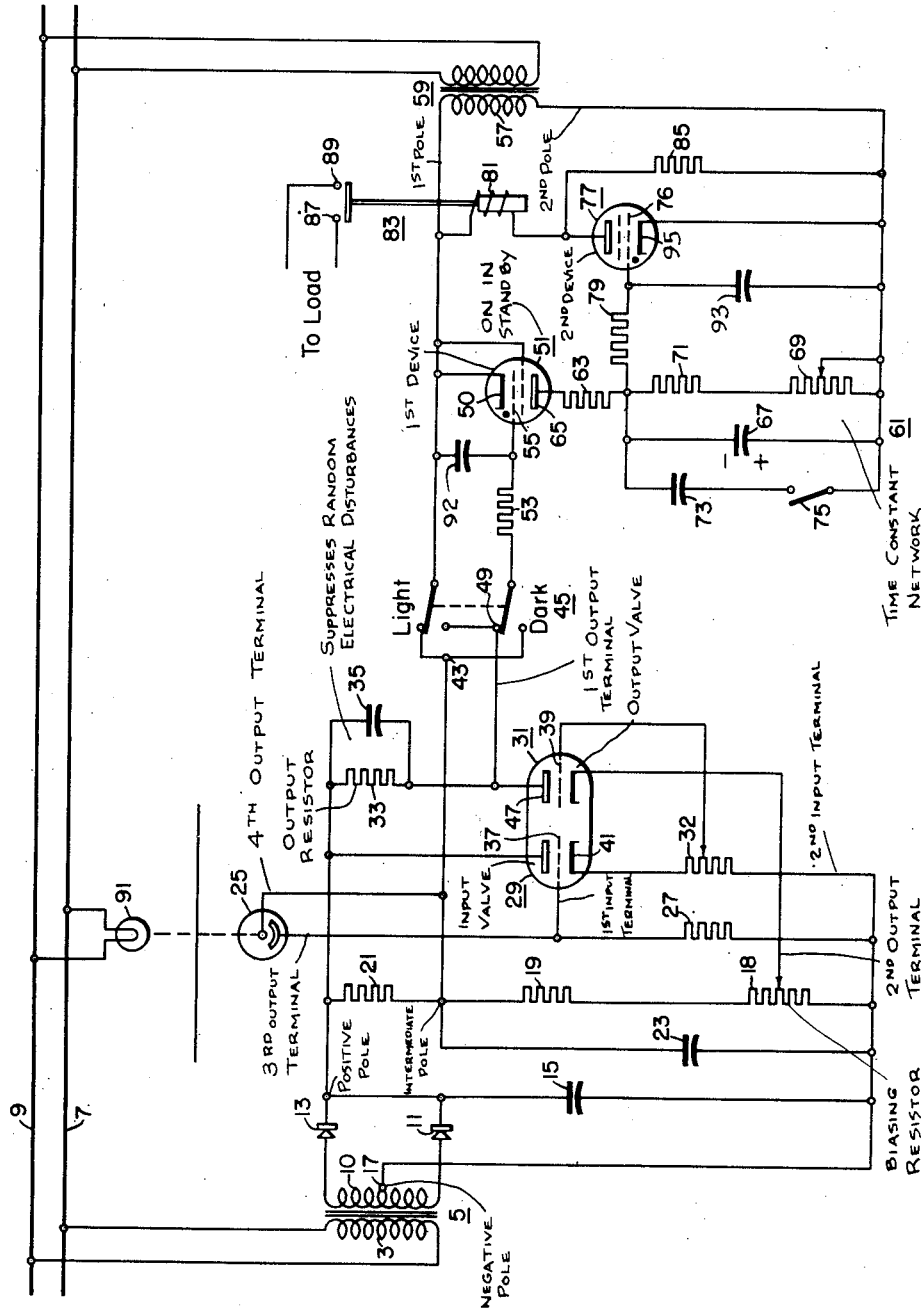

2,809,297

TIME DELAY CONTROL

Edward C. Hartwig, Lancaster, and Francis T. Bailey, East Aurora, N. Y., assignors to Westinghouse Electric Corporation, East Pittsburgh, Pa., a corporation of Pennsylvania Application October 3, 1951, Serial No. 249,592

10 Claims. (Cl. 250—214)

Our invention relates to a photo-electric control system and particularly to a control which has a delayed response. Such a control is useful for example in detecting a jam on a package conveyor belt. The packages interrupt a beam of light and so long as there is a predetermined gap between the packages normal operation continues. As soon as the packages jam at one point, the gap lengthens and a corrective operation takes place. The control may also be used to classify bodies in accordance with their dimensions. In this case the bodies interrupt a beam of light. So long as the interruption is below a predetermined duration, normal operation continues. When this duration is exceeded, there is a signal or a correction operation.

Prior time delay photo-electric controls of which we are aware were relatively complex in that they involved a large number of electric valves and elaborate circuits. Their mode of operation was such that their timing was varied in response to the unpredictable variations of voltage peaks of commercial power sources. Since there is an inherent variation in the amplitude of successive peaks of voltage of any commercial power supply, an inaccuracy is introduced into the timing afforded by any such system.

It is, accordingly, an object of our invention to provide a time delay mechanism which accurately measures intervals of time regardless of minor variations in the source voltage.

It is a further object of our invention to provide a time delay photo-electric relay which is simple and yet accurate in operation.

It is a further object of our invention to provide a time delay photo-electric relay which will operate after a time delay which is independent of slight variations in the source voltage.

In a circuit according to our invention a capacitor is initially charged through a grid controlled electric valve. A resistor is connected across the capacitor to discharge the capacitor at a predetermined rate. Timing is initiated by cutting off the grid controlled valve to permit the capacitor to discharge through the resistor. When the capacitor has discharged sufficiently, it permits a second valve to become conductive to close an electromagnetic relay.

The novel features that we consider characteristic of our invention are set forth with particularity in the appended claims. The invention itself, however, both as to its organization and its method of operation together with additional objects and advantages thereof will best be understood from the following description of a specific embodiment when read in connection with the accompanying drawing which is a diagrammatic view of a controller according to our invention.

In the apparatus shown in the drawing, the primary 3 of a power transformer 5 is connected to power lines 7 and 9 which are connected to a commercial source of power. The end terminals of the secondary 10 are connected through dry rectifiers 11 and 13 and a capacitor 15 to a mid-tap 17 on the secondary 10 of the power transformer 5. Three resistors 18, 19 and 21 are connected across the capacitor 15. A second capacitor 23 is connected across two of the resistors 18 and 19. In effect, a direct-current supply is thus produced which has, as labeled in the drawing, a Positive Pole, a Negative Pole and an Intermediate Pole.

A photocell 25 is connected in series with a resistor 27 and in parallel with the capacitor 15.

The photocell 25 has a pair of output terminals labeled in the drawing "3rd Output Terminal" and "4th Output Terminal" which are connected to the input terminals labeled in the drawing "1st Input Terminal" and "2nd Input Terminal" of an amplifier. This amplifier includes high vacuum triode sections or tubes 29 and 31 labeled "Input Valve" and "Output Valve" and output terminals labeled "1st Output Terminal" and "2nd Output Terminal." The first high vacuum tube 29 having a resistor 32 in its cathode circuit is connected in parallel with the first capacitor 15. The second high vacuum tube 31 is connected from one terminal of the first capacitor 15 through a resistor 33, labeled "Output Resistor" and capacitor 35 in parallel to a rider on the resistor 18 to the other terminal of the first capacitor 15.

The grid 37 of the first high vacuum tube 29 is connected between the photocell 25 and the resistor 27. The grid 39 of the second high vacuum tube 31 is connected to the tap of resistor 32 which is in turn connected between the cathode 41 and the negative terminal 17 of the first high vacuum tube 29. One terminal of the photocell 25 is connected to a terminal 43 on a light-dark switch 45. The anode 47 of the second high vacuum tube 31 is connected to the other terminal 49 of the light-dark switch 45. The amplifier 29—31 may thus be said to have the "1st input terminal" at the grid 37 and the "2nd input terminal" at the rider of resistor 18 and the "1st output terminal" at the anode 47 and the "2nd output terminal" at the lower end of resistor 21.

One terminal of the light-dark switch 45 is connected to the cathode 50 of a first thyratron 51 labeled "1st Device." The other terminal of the light-dark switch 45 is connected through a grid resistor 53 to the control grid 55 of the thyratron 51. A surge suppressor capacitor 92 is connected between the grid 55 and the cathode 50. A circuit may be traced from the cathode 50 of the thyratron 51 through the secondary 57 of a second power transformer 59 through a time constant network 61 and a current limiting resistor 63 to the anode 65 of the thyratron 51. As labeled, the secondary 57 has a "1st Pole" and a "2nd Pole." The time constant network 61 comprises a capacitor 67 connected in parallel with the first and second resistor 69 and 71. The first resistor 69 is adapted to be varied from zero to its full resistance. A second capacitor 73 may be connected through a switch 75 in parallel with the first capacitor 67. The network 61 has a characteristic timing effect. When the capacitor 67 is charged and then permitted to discharge, the time of discharge is determined by the magnitude of the resistors 69 and 71 and the capacitor 67. About ⅓ of the charge on capacitor 67 is dissipated in a time interval equal to $$\frac{1}{RC}$$

where R is the resistance and C the capacity of the network. Such a network is thus called a time-constant network because it has a characteristic time constant $$\left(\frac{1}{RC}\right)$$

The control grid 76 of a second thyratron 77 labeled "2nd Device" is connected through a grid resistor 79 to the time constant circuit 61. A surge suppressor capacitor 93 is connected between the grid 76 and the cathode 95. The second thyratron 77 is connected to the secondary 57 of the second power transformer 59 through the actuating coil 81 of a relay 83. A resistor 85 having a high resistance is connected in parallel with the second thyratron 77. The relay 83 is arranged to open or close the contacts 87 and 89 in circuit with the load. A source of light 91 is shown connected to the power lines 7 and 9 and disposed to project light on the photocell 25.

Before the circuit is in condition to respond to a light stimulus, current flows from the second power transformer 59 through the first thyratron which as shown on the drawing is usually conducting, to charge the time constant circuit 61. The time constant circuit 61 then maintains the grid 76 of the second thyratron 77 negative with respect to its cathode and the second thyratron 77 is non-conductive.

The operation of this circuit will first be described with the light-dark switch 45 in the light or upper position shown in the drawing. When the switch 45 is in this position, the relay 83 is deenergized during the time that light is not shining on the photocell 25. When light is projected on the photocell 25, a current flows through the photocell 25 and resistor 27, making more positive the upper terminal of the resistor 27. Current from the first power transformer 5 is rectified through the dry rectifiers 11 and 13. Rectifier ripple is smoothed out by the first capacitor 15. A voltage is impressed across the two high vacuum tubes 29 and 31. When current flows through the photocell 25 it renders the grid 37 of the first high vacuum tube 29 less negative with respect to its cathode 41 and the first high vacuum tube 29 becomes conductive, passing a current through its cathode resistor 32.

The grid 39 of the second high vacuum tube 31 which is connected to the cathode resistor 32 becomes less negative with respect to its cathode and the second high vacuum tube 31 conducts current through its anode resistor 33.

We have found that despite the presence of the filtering capacitor 15, a certain amount of hash appears in the circuit through the second high vacuum tube 31. For that reason, a capacitor 35 is connected in parallel with the anode resistor 33 of this tube 31 to remove that hash. This capacitor 35 does not otherwise affect the circuit. The three resistors 18, 19 and 21 form a voltage divider, one terminal of which is connected through the light-dark switch 45 to the cathode 50 of the first thyratron 51. The grid circuit for thyratron 51, with the switch 45 in the position shown, may be traced from the grid 55 through resistor 53, lower switch blade (49), resistor 33, resistor 21, upper switch blade to cathode 50. When there is no light on photocell 25, the current flow through resistor 33 is so low that the positive drop across resistor 21 prevails and the thyratron 51 conducts. When there is light on the cell 25 and the conductivity of the second high vacuum tube 31 increases, it increases the voltage on its anode resistor 33 and this voltage exceeds the voltage impressed on the first resistor 21 in the voltage divider sufficiently to render the control grid 55 of the first thyratron 51 negative with respect to the cathode 50. The first thyratron 51 then becomes non-conductive. An analogous situation prevails with the switch 45 in the Dark (lower) position. In this case, the resistor 21 provides a negative bias potential which is counteracted by the potential across resistor 33; the latter potential becomes low when the light to cell 25 is blocked. In either case, the capacitor 67 in the time constant circuit 61 discharges through the resistors 69 and 71 connected in parallel with it until the control grid 76 of the second thyratron 77 is at the potential of the cathode. The second thyratron 77 then becomes conductive passing current through the actuating coil 81 of the relay 83 and closing the circuit to the load. When the illumination from the light ceases to fall on the photocell 25, the photocell becomes non-conductive rendering non-conductive the first and second high vacuum tubes 29 and 31 and allowing the first control thyratron 51 to become conductive. When the first control thyratron 51 becomes conductive, it charges the time constant circuit 61 and thereby renders the second control thyratron 77 non-conductive. During the half cycle when the second thyratron 77 is non-conductive, a small current is conducted through the high resistance resistor 85 in parallel with the second control thyratron 77. Current flowing through this resistor 85 tends to demagnetize the actuating coil 81 of the relay 83 and enable it to drop out more rapidly. When the relay 83 drops out the circuit is in its original condition and is prepared to respond to a second stimulus from the light.

If the light-dark switch 45 is thrown into the other position from that shown in the drawing, light falling on the photocell maintains the first control thyratron 51 conductive since it now causes the cathode 50 to be negative with respect to the control grid 55. When light falling on the photocell 25 is interrupted, the voltage across the anode resistor 33 of the second high vacuum tube is decreased and the cathode 50 of the first control thyratron 51 becomes positive with respect to the grid 55. Current flow to the time constant circuit 61 is interrupted and after the time constant capacitor 67 has discharged sufficiently, the second control thyratron 77 becomes conductive to close the relay 83.

It is to be noted that this circuit allows adjustment for a wide variation in timing. The second time constant resistor 69 is variable from zero resistance to the full resistance of the resistor. Further, delay in the discharge of the time constant circuit 61 may be provided by closing the switch 75 which places the second time constant capacitor 73 in the circuit.

We have found that in some photocell amplifier circuits which include a high impedance between the grid and cathode the grid tends to emit electrons, thus increasing the current in the amplifier. If no provision is made to absorb this grid current, it will introduce error into the amplified signal.

In our present circuit, the impedance of the resistor 27 is high, of the order of several megohms, because the cell 25 has an impedance of the same order. Because this resistance is high, it causes current to flow between the grid 37 and the cathode 41 of the first high vacuum tube 29 by reason of grid emission. To decrease the effect of this grid emission current, the first high vacuum tube 29 is connected in a cathode follower circuit. Thus, if the grid 37 conducts current, its potential becomes more positive and the current flow through the anode circuit of tube 29 and cathode resistor 32 increases tending to render more positive the potential of the cathode 41. This counteracts the increased potential produced by the flow of emission current through the high resistor 27 and thereby increases the fidelity of response of the amplifier.

A system which we have found to operate satisfactorily includes the following components.

Source potential 460 volts.
Potential across secondary 10_____ 230 volts.
Potential across secondary 57_____ 200 volts.
Capacitor 15_____ 8 microfarads.
Capacitor 23_____ 8 microfarads.
Capacitor 35_____ 0.01 microfarad.
Capacitor 73_____ 1 microfarad.
Capacitor 67_____ 1 microfarad.
Resistor 21_____ 15,000 ohms.
Resistor 19_____ 22,000 ohms.
Resistor 18_____ 5,000 ohms.
Resistor 27_____ 6,800,000 ohms.
Resistor 32_____ 94,000 ohms.
Resistor 33_____ 220,000 ohms.
Resistor 53_____ 100,000 ohms.
Resistor 63_____ 47,000 ohms.
Resistor 71_____ 68,000 ohms.
Resistor 69_____ 1,000,000 ohms.

| Resistor 79 | 100,000 ohms. |
|---|---|
| Resistor 85 | 33,000 ohms. |
| Photocell 25 | 1P40. |
| Tube 29 and 31 | 6SL7. |
| Valve 51 | WL 2050. |
| Valve 77 | WL 2050. |

Although we have shown and described certain specific embodiments of our invention, we are fully aware that many modifications thereof are possible. For example, the valves 51 and 77 connected to the time constant circuit and to the relay may be high vacuum tubes or tubes controlled by means other than grid. The tubes in the amplifier circuit need not be high vacuum tubes and they may have more than one grid. Our invention, therefore, is not to be restricted except insofar as is necessitated by the prior art and by the spirit of the appended claims.

We claim as our invention:

1. In combination an amplifier having a first input terminal, a second input terminal, a first output terminal and a second output terminal; photo-sensitive means having a third output terminal and a fourth output terminal; means for connecting said third output terminal to said first input terminal; means for connecting said fourth output terminal to said second input terminal; an electric discharge device having an anode, a cathode and a control electrode; means for connecting said first output terminal to said control electrode; means for connecting said second output terminal to said cathode; a time constant network; means for connecting said anode and cathode in series with said network; a second electric discharge device having an anode, a cathode and a control electrode; means for connecting said network between said last-named control electrode and said last-named cathode; current responsive means; and means for connecting said last-named anode and said last-named cathode in circuit with said current responsive means.

2. The combination according to claim 1 characterized by means for suppressing random electrical disturbances interposed between said first output terminal and said second output terminal.

3. In combination an amplifier having a first input terminal, a second input terminal, a first output terminal and a second output terminal; photo-sensitive means having a third output terminal and a fourth output terminal; means for connecting said third output terminal to said first input terminal; means for connecting said fourth output terminal to said second input terminal; an electric discharge device having an anode, a cathode and a control electrode; means for connecting selectively either said first output terminal to said control electrode and said second output terminal to said cathode, or said first output terminal to said cathode and said second output terminal to said control electrode; a time constant network; means for connecting said anode and cathode in series with said network; a second electric discharge device having an anode, a cathode and a control electrode; means for connecting said network between said last-named control electrode and said last-named cathode; current responsive means; and means for connecting said last-named anode and said last-named cathode in circuit with said current responsive means.

4. In combination means for supplying direct current power including a positive pole and a negative pole; an amplifier having at least an input valve and an output valve, each valve including an anode; a cathode and a control electrode and said amplifier also having a first input terminal connected to the control electrode of said input valve, a second input terminal connected to the cathode of said input valve; an output resistor connected between the anode of said output valve and said positive pole; a biasing resistor connected between said positive pole and said negative pole; means for connecting the cathodes of said valves to said negative pole; a first output terminal for said amplifier connected to said anode of said output valve; a second output terminal for said amplifier connected to said biasing resistor; photo-sensitive means having a third output terminal and a fourth output terminal; means for connecting said third output terminal to said first input terminal; means for connecting said fourth output terminal to said biasing resistor; a first electric discharge device having an anode, a cathode and a control electrode; means for connecting said first output terminal to said control electrode; means for connecting said second output terminal to said cathode; a second electric discharge device having a first principal electrode, a second principal electrode and a control electrode; a time constant network connected between said last-named control electrode and said first principal electrode; current responsive means; additional means for supplying power including a first pole and a second pole; means for connecting said first pole, said second pole, said network and said anode and cathode of said first device in series; and means for connecting said first pole, said second pole, said current responsive means, said first principal electrode and said second principal electrode in series.

5. In combination means for supplying direct current power including a positive pole and a negative pole; an amplifier having at least an input valve and an output valve, each valve including an anode; a cathode and a control electrode and said amplifier also having a first input terminal connected to the control electrode of said input valve, a second input terminal connected to the cathode of said input valve; an output resistor connected between the anode of said output valve and said positive pole; a biasing resistor connected between said positive pole and said negative pole; means for connecting the cathodes of said valves to said negative pole; a first output terminal for said amplifier connected to said anode of said output valve; a second output terminal for said amplifier connected to said biasing resistor; photo-sensitive means having a third output terminal and a fourth output terminal; means for connecting said third output terminal to said first input terminal; means for connecting said fourth output terminal to said biasing resistor; a first electric discharge device having an anode, a cathode and a control electrode; means for selectively connecting either said first output terminal to said control electrode and said second output terminal to said cathode or said first output terminal to said cathode and said second output terminal to said control electrode; a second electric discharge device having a first principal electrode, a second principal electrode and a control electrode; a time constant network connected between said last-named control electrode and said first principal electrode; current responsive means; additional means for supplying power including a first pole and a second pole; means for connecting said first pole, said second pole, said network and said anode and cathode of said first device in series; and means for connecting said first pole, said second pole, said current responsive means, said first principal electrode and said second principal electrode in series.

6. The combination according to claim 4 characterized by a capacitor connected in shunt with said output resistor, said capacitor having a magnitude such as to suppress random fluctuations in the anode circuit of said output valve.

7. In combination direct-current supply means including a positive pole, a negative pole and an intermediate pole; an amplifier having at least an output tube having a pair of principal electrodes and a control electrode; a photo-sensitive device having a pair of principal electrodes; means for coupling said principal electrodes of said device to said control electrode so that the conductivity between said principal electrodes is dependent on the excitation of said device; an output resistor; means including said output resistor for connecting one of said principal electrodes of said output tube to said positive pole; means for connecting said other principal electrode to said negative pole; an electric discharge device having an anode, a cathode and a control electrode; means for connecting said one of said principal electrodes to said control electrode of said discharge device; means for connecting said intermediate pole to said cathode; a time constant network; alternating current supply means having a first pole and a second pole; means for connecting in series said first pole, said second pole, said time constant network, said anode and said cathode; a second electric discharge device having a control electrode and a pair of prinicipal electrodes; current responsive means; means for connecting said time constant network between said control electrode and one of said principal electrodes; and means for connecting in series said first pole, said second pole, said principal electrodes of said second device and said responsive means.

8. In combination direct-current supply means including a positive pole, a negative pole and an intermediate pole; an amplifier having at least an output tube having a pair of principal electrodes and a control electrode; a photo-sensitive device having a pair of principal electrodes; means for coupling said principal electrodes of said device to said control electrode so that the conductivity between said principal electrodes is dependent on the excitation of said device; an output resistor; means including said output resistor for connecting one of said principal electrodes of said output tube to said positive pole; means for connecting said other principal electrode to said negative pole; an electric discharge device having an anode, a cathode and a control electrode; means for connecting said one of said principal electrodes to said cathode of said discharge device; means for connecting said intermediate pole to said control electrode of said discharge device; a time constant network; alternating current supply means having a first pole and a second pole; means for connecting in series said first pole, said second pole, said time constant network, said anode and said cathode; a second electric discharge device having a control electrode and a pair of principal electrodes; current responsive means; means for connecting said time constant network between said control electrode and one of said principal electrodes; and means for connecting in series said first pole, said second pole, said principal electrodes of said second device and said responsive means.

9. In combination direct-current supply means including a positive pole, a negative pole and an intermediate pole; an amplifier having at least an output tube having a pair of principal electrodes and a control electrode; a photo-sensitive device having a pair of principal electrodes; means for coupling said principal electrodes of said device to said control electrode so that the conductivity between said principal electrodes is dependent on the excitation of said device; an output resistor; means including said output resistor for connecting one of said principal electrodes of said output tube to said positive pole; means for connecting said other principal electrode to said negative pole; a first thyratron having an anode, a cathode and a control electrode; means for selectively connecting either said one of said principal electrodes to said control electrode of said thyratron and said intermediate pole to said cathode or said one of said principal electrodes to said cathode and said intermediate pole to said control electrode of said thyratron; a time constant network; alternating current supply means having a first pole and a second pole; means for connecting in series said first pole, said second pole, said time constant network, said anode and said cathode; a second thyratron having an anode, a cathode and a control electrode; current responsive means; means for connecting said time constant network between said control electrode and said cathode of said second thyratron; and means for connecting in series said first pole, said second pole, said anode, said cathode and said responsive means.

10. The combination according to claim 7 characterized by a capacitor in shunt with said output resistor, said capacitor being dimensioned to suppress random fluctuations in the principal electrode circuit of said output tube.

References Cited in the file of this patent
UNITED STATES PATENTS

| | | |
|---|---|---|
| 1,015,968 | Lehr | Jan. 30, 1912 |
| 1,077,319 | Tatum | Nov. 4, 1913 |
| 2,304,641 | Jones | Dec. 8, 1942 |
| 2,352,240 | Wolfner | June 27, 1944 |
| 2,372,516 | Rechton | Mar. 27, 1945 |
| 2,434,101 | Cann | Jan. 6, 1948 |
| 2,438,017 | Murcek | Mar. 16, 1948 |
| 2,488,505 | Wannamaker | Nov. 15, 1949 |
| 2,529,161 | Kelling et al. | Nov. 7, 1950 |
| 2,547,332 | Loveless | Apr. 3, 1951 |
| 2,590,973 | Jordan | Apr. 1, 1952 |
| 2,711,094 | Edelman et al. | June 21, 1955 |

OTHER REFERENCES

"Electronics," July 1950, pp. 70–73.